US 6,288,893 B1

(12) United States Patent
Faranda et al.

(10) Patent No.: US 6,288,893 B1
(45) Date of Patent: Sep. 11, 2001

(54) DESKTOP COMPUTER SYSTEM HAVING REDUCED FOOTPRINT SEMI-MOBILE CPU UNIT

(75) Inventors: Robert T. Faranda, Boxborough; Bradford G. Chapin, Ayer, both of MA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/244,453

(22) Filed: Feb. 4, 1999

(51) Int. Cl.[7] ............................... G06F 1/16; A47B 91/00
(52) U.S. Cl. ..................... 361/683; 361/679; 312/223.2; 345/905; D14/107
(58) Field of Search ..................... 361/679, 683, 361/686; 312/223.1, 223.2; 345/905; 369/75.1; D14/106, 107

(56) References Cited

U.S. PATENT DOCUMENTS

| | | | |
|---|---|---|---|
| 5,235,493 | * 8/1993 | Yu | 361/685 |
| 5,261,734 | * 11/1993 | Speraw | 312/223.1 |
| 5,388,792 | 2/1995 | Hastings et al. | 248/188.1 |
| 5,438,476 | * 8/1995 | Steffes | 312/223.2 |
| 5,593,219 | * 1/1997 | Ho | 312/223.1 |
| 5,621,612 | * 4/1997 | Dahmen | 361/683 |
| 5,749,637 | * 5/1998 | McMahan et al. | 312/223.2 |
| 5,865,518 | * 2/1999 | Jarrett et al. | 312/223.2 |

OTHER PUBLICATIONS

"New Products"—PC World—Aug., 1998.
Hitachi Vision Desk AD—PC Connection (undated).
"Technology and You" Article—Businessweek—Mar., 1998.
Akia Mystique Advertising Material—1998.
Mitac Eco Advertising Material—undated.
Hitachi Vision Desk Advertising Material—undated.
"Visioneering" by Steve McCallion—Innovation Winter 1998.
"Akia Mystique Desktop M233"—Computer Shopper—Mar., 1998.

* cited by examiner

Primary Examiner—Leo P. Picard
Assistant Examiner—Lis Lea-Edmonds

(57) ABSTRACT

A desktop computer system is provided with a semi-mobile CPU unit having a portable computer form factor to thereby substantially reduce the desktop area required for the CPU unit. The CPU unit utilizes portable computer internal components, but is constructed without an internal battery pack or power conversion system, and without an integral display, keyboard or pointing device. A recessed support bar is exteriorly carried by an end wall of the CPU unit housing and may be pivoted outwardly therefrom to form a bracing base structure facilitating the repositioning of the CPU unit from a horizontal desktop orientation to a vertical tower orientation.

46 Claims, 3 Drawing Sheets

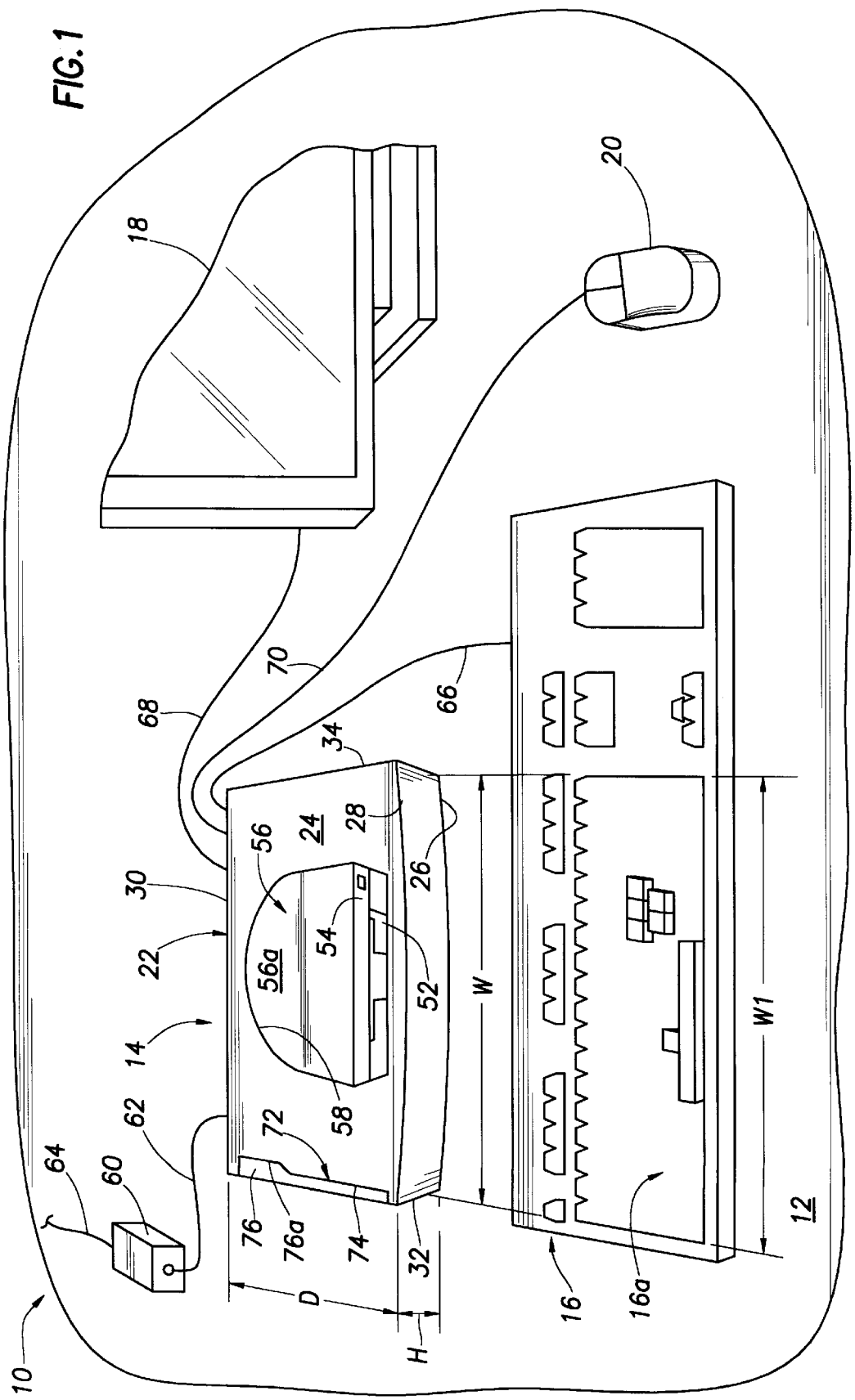

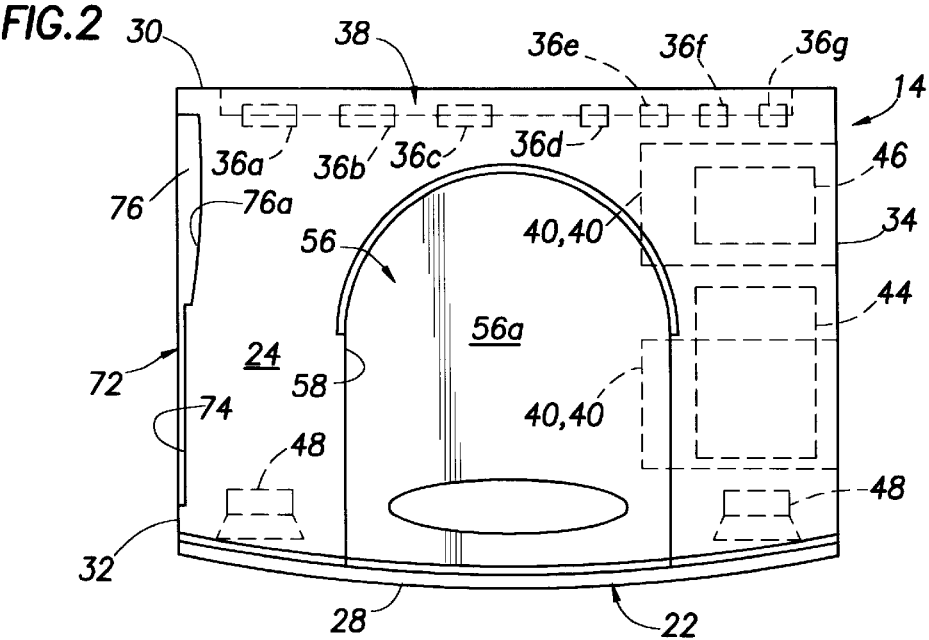

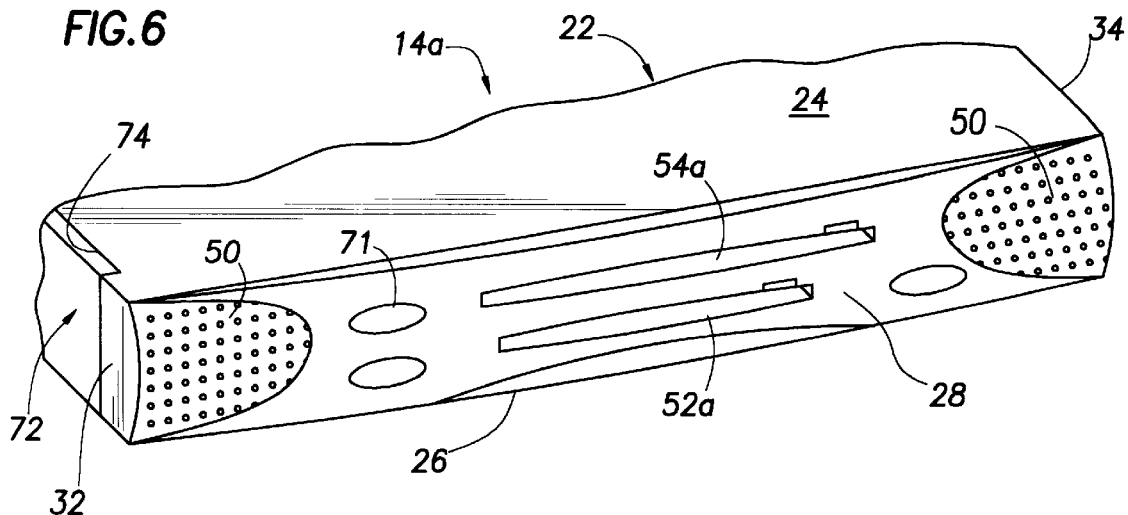
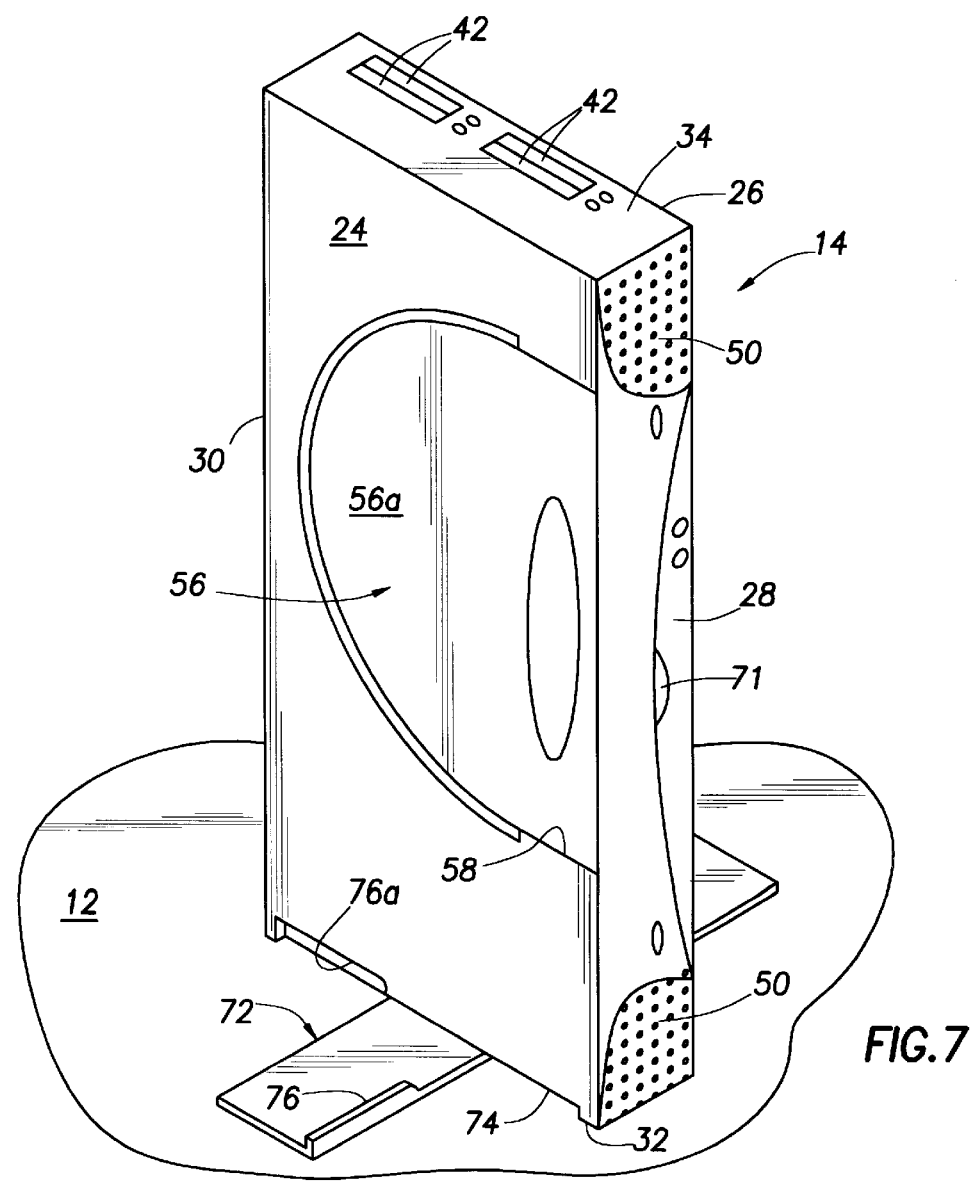

DESKTOP COMPUTER SYSTEM HAVING REDUCED FOOTPRINT SEMI-MOBILE CPU UNIT

BACKGROUND OF THE INVENTION

1. Field of the Invention

The present invention generally relates to electronic apparatus and, in a preferred embodiment thereof, more particularly relates to desktop computer apparatus.

2. Description of Related Art

In the personal computing arena there are presently two different types of computers—(1) desktop computers, and (2) portable or "mobile" computers such as the popular notebook computer. Each type of personal computer has well known advantages over the other type. However, each also has a variety of well known disadvantages and limitations. Because of this, many computer users find it necessary to own both types of personal computers in order ito obtain both the mobility of a portable computer and the greater functionality and comfort of use of a desktop computer.

As is well known, conventionally constructed desktop personal computers have large form factors and undesirably take up relatively large amounts of desktop work area—an area which is often at a premium in both home and office worwk environments. A variety of electrical components are typically incorporated into a desktop computer, such as a power supply, a microprocessor, memory, storage drives such as hard disk drives and removable media drives, and logic circuitry for controlling standard desktop peripheral devices such as keyboards and pointing devices.

Desktop personal computers, as presently constructed, also typically include option card slots for one or more of the personal computer's standard option cards such as, for example, Peripheral Component Interconnect (PCI), Enhanced Industry Standard Architecture ("EISA"), and Industry Standard Architecture (ISA) cards. The PCI, EISA and ISA option cards can be, for example, display (monitor) controller cards, memory controller cards, or hard disk drive controller cards. The desktop personal computer's power supply also requires a transformer and, because the internal power supply has heat-generating components, a fan can also be required.

Despite various attempts by manufacturers to simplify the task, reconfiguring the desktop personal computer is typically not an easy undertaking. Replacing, adding or removing a PCI, EISA or ISA option card requires opening the desktop personal computer to gain access to its interior. It is also necessary to open the computer to replace a defective component such as a power supply or fan, or to remove, add or replace a storage drive.

The desktop personal computer can be required to be moved, for example, between offices, to a computer store for service, or to a college dormitory. Such movement of a desktop computer can be a somewhat difficult, awkward task because of the computer's large form factor and weight. AS previously mentioned, another disadvantage of the conventionally constructed desktop computer is its large footprint area which limits the workspaces on which the desktop personal computer can be utilized.

The personal computer's components have been miniaturized in order to provide lightweight, non-bulky, small form factor mobile computers such as the ever popular notebook computer. Such miniaturized components include, for example, the Personal Computer Memory Card International Association ("PCMCIA") option cards, also known as PC cards, and storage devices. Unlike standard desktop personal computer option cards, such as PCI, EISA and ISA option cards, portable computer PC cards are easily added, replaced or removed without opening the portable computer.

Although portable notebook computers have a smaller form factor than desktop personal computers, are lightweight and non-bulky, and their option cards are easier to reconfigure, portable computers lack some of the desirable functionality of desktop computers. For example, portable personal computers typically have a small number of option slots. Additionally, because the typical portable computer can operate from a battery, its design is influenced by the requirement for low power consumption. To provide this necessary low power consumption, portable personal computers tend to utilize at least somewhat lower speed components such as memory and microprocessors. Accordingly, portable computers can have lower performance than desktop computers.

Portable computers such as notebook computers typically support standard external desktop computer peripheral devices such as, for example, detached keyboards, pointing devices and displays (monitors). However, this creates redundancy because portable computers also have integrated peripheral devices such as keyboards, pointing devices and displays.

Personal computer users requiring the functionality of a desktop computer and the mobility of a portable computer presently are forced to purchase both computer types. Disadvantages of requiring both a desktop computer and a portable computer include the increased cost of purchasing two computers and the necessity of transferring data between the two computers.

It can thus be seen from the foregoing that a need exists for a computer which provides functional advantages of a desktop computer along with various desirable aspects of the portable computer such as a small form factor, a small desktop area footprint, and light weight and corresponding mobility. It is to this need that the present invention is directed.

SUMMARY OF THE INVENTION

In carrying out principles of the present invention, in accordance with a preferred embodiment thereof, a desktop computer system is provided which has a specially designed reduced footprint CPU unit that uniquely combines the functionality of a conventional desktop CPU unit with the compactness and mobility of a portable notebook computer.

The CPU unit includes a housing preferably having a portable notebook computer form factor, and electrical computer components closely received in the housing. Preferably, the electrical computer components are at least predominately miniaturized portable computer components such as notebook computer components. More preferably, such components are substantially entirely miniaturized portable computer components. The electrical computer components representatively include an I/O system to which an external keyboard, an external display device and an external pointing device may be operatively connected, a data storage device and a microprocessor for retrieving data therefrom, but does not include an integral keyboard, display or pointing device. Such components also preferably do not include an internal battery pack or power supply/transformer structure and associated cooling fan. The overall computer system also includes a desktop computer keyboard connectable to the I/O connector section, a desktop computer display device connectable to the I/O connector section, and a desktop computer pointing device connectable to the I/O connector section.

Also preferably incorporated in the reduced footprint desktop computer unit are a media drive unit, illustratively a CD ROM drive, and a floppy disk drive. In one embodiment of the CPU unit these two drives are linked together in a pop-Up structure that is pivotable into and out of the housing through an exterior wall opening therein. In another embodiment the two drives are fixedly positioned within the housing inwardly of two exterior housing wall slots associated with the drives.

The reduced footprint CPU unit preferably has an elongated, generally rectangular configuration with an end section having an end wall extending between opposite top and bottom side walls of the housing. According to another aspect of the invention, the housing is positionable on a horizontal support surface in (1) a horizontal desktop orientation in which the bottom housing side wall rests upon the support surface, and (2) a vertical tower orientation in which the housing end wall rests upon the support surface. To stabilize the housing in its vertical tower orientation, a specially designed stabilizing structure is provided.

In a preferred embodiment thereof, the stabilizing structure includes an elongated stabilizing bar member which, when the housing is in its horizontal desktop orientation, is complementarily received within a recess formed in the end wall of the housing in a manner such that the bar is essentially flush with the housing end portion with which it is associated. When the housing is to be positioned in its vertical tower orientation the bar is pivotable outwardly to an extended stabilizing orientation in which opposite end portions thereof extend outwardly beyond the top and bottom sides of the housing so that the outwardly projecting bar end portions will supportingly engage the support surface when the housing is placed in its vertical tower orientation. When the bar is pivoted back to its previous retracted position within the housing end portion recess, transverse edge flanges on the opposite bar end portions complementarily enter corresponding top and bottom side recesses on the housing to thereby automatically limit the inward pivoting of the bar and maintain it in its essentially flush relationship with the housing end portion with which it is associated.

BRIEF DESCRIPTION OF THE DRAWINGS

FIG. 1 is a simplified perspective view of a desktop computer system incorporating therein a specially designed reduced footprint CPU unit embodying principles of the present invention;

FIG. 2 is an enlarged scale top plan view of the CPU unit;

FIG. 3 is an enlarged scale right end elevational view of the CPU unit;

FIG. 4 is an enlarged scale front side elevational view of the CPU unit;

FIG. 5 is an enlarged scale left end view of the CPU unit with a top mounted pop-up CD ROM drive/floppy drive section downwardly retracted and further illustrating in phantom the operation of a specially designed stabilizing support bar portion of the CPU unit operative to brace the unit when it is oriented in a vertical tower position;

FIG. 6 is an enlarged scale perspective view of a front side portion of an alternate embodiment of the CPU unit; and FIG. 7 is an enlarged scale perspective view of the CPU unit operatively positioned in its alternate vertical tower orientation.

DETAILED DESCRIPTION

Referring initially to FIG. 1, in a preferred embodiment thereof, the present invention provides a computer system 10 which is positionable on a horizontal work surface such as the illustrated desktop area 12. The desktop computer system 10 includes a specially designed, miniature footprint semi-mobile CPU unit 14, and three conventional desktop computer peripheral devices—a keyboard 16, a monitor 18, and a pointing device, representatively in the form of a mouse 20.

The CPU unit 14 preferably has a horizontally elongated outer rectangular housing 22 with a portable notebook computer form factor—i.e., a left-to-right horizontal width W within the range of from about 10.5" to about 11.5"; a front-to-rear depth D within the range of from about 8.0" to about 9.0"; and a vertical height H within the range of from about 1" to about 2". Preferably, in the illustrated embodiment of the CPU unit 16, the dimension W is approximately 11"; the dimension D is approximately 8.5"; and the dimension H is approximately 1.5". Housing 22 has top and bottom side walls 24 and 26, front and rear side walls 28 and 30, and left and right end walls 32 and 34.

With additional reference now to FIGS. 2–5, housing 22 has various electrical computer components operatively disposed and closely received therein. These electrical components representatively include:

(1) various I/O connectors 36a–36g incorporated in an I/O section 38 positioned inwardly adjacent the rear housing side wall 30;

(2) two vertically stacked pairs of type II PC card receptacles 40 disposed in a lower right interior portion of the housing 22 and having associated card-receiving slots 42 positioned on a lower side portion of the right housing end wall 34;

(3) a hard disk drive 44 disposed above the pairs of PC card receptacles 40 and operative to store data;

(4) a microprocessor 46 disposed above the pairs of PC card receptacles 40 and operative to retrieve data stored by the hard disk drive 44;

(5) a pair of speakers 48 disposed behind grille structures 50 disposed on opposite lower end portions of the front housing side wall 28;

(6) a floppy disk drive 52 disposed generally between the speakers 48; and (7) a CD ROM drive 54 overlying the floppy disk drive 52 and also overlying left end portions of the stacked pairs of PC card receptacles 40 within the interior of the housing 22.

The electrical computer components disposed within or otherwise carried by the housing 22 do not, however, include an battery pack, an internal power supply with transformer and associated cooling fan, an integral keyboard, an integral display device, or an integral pointing device. Preferably, the electrical computer components are at least predominantly miniaturized portable computer components such as portable notebook components. More preferably, such components are substantially entirely miniaturized portable computer components.

As illustrated in FIGS. 1–5 and 7, the floppy disk drive 52 and the CD ROM drive 54 are linked together in a pop-up structure 56 which is carried within the housing 22 for pivotal movement into and out of the housing 22, through a suitable opening 58 formed in its top side wall 24, between an upwardly extended position shown in FIGS. 1–4, and a downwardly retracted position shown in FIGS. 5 and 7. The pop-up drive structure 56 is suitably spring-biased toward its upwardly extended position, and is releasably retained in its downwardly retracted position, in which the top side 56a of the structure 56 is flush with the top side 24 of the housing 22, by a conventional push-push latch structure (not shown).

A front side portion of an alternate embodiment 14a of the CPU unit 14 is perspectively illustrated in FIG. 6. In the CPU unit 14a, the top side housing opening 58 is eliminated, and the previously described floppy disk drive and CD ROM drive are stationarily positioned within the interior of the housing 22 respectively behind horizontally oriented disk-receiving slots 52a and 54a formed in the front side wall 28 of the housing 22. The CD ROM drive within the housing 22 of the alternate CPU unit embodiment 14a is of a conventional type (such as that often provided in the sound systems of cars and trucks) in which a compact disk partially inserted into the slot 54a is automatically drawn into the CD drive, and may later be manually ejected therefrom.

The substantially reduced desktop area required by the portable computer form factor desktop CPU unit 14 compared to a conventionally configured desktop CPU unit may be clearly seen in FIG. 1. AS illustrated, the operatively positioned CPU unit 14 is only slightly higher than the desktop keyboard 16, and has a width W generally equal to the width W1 of the main portion 16a of the keyboard 16. DC electrical power is supplied to the CPU unit 14 by an external power supply/transformer unit 60 respectively coupled to the I/O section on rear side 30 of the housing 22, and to a suitable source of AC electrical power, by power supply wires 62 and 64. Additionally, the external keyboard 16, monitor 18 and pointing device 20 are operatively coupled to the CPU I/O section 38 by cables 66,68 and 70. Alternatively, for the external keyboard 16 and pointing device 20 the I/O system of the CPU unit 14 may also include an infrared signal receiving system, having a receiving lens portion 71 on the front side wall 28 of the housing 22 of the CPU units 14 and 14a, for receiving input signals from the keyboard and pointing device.

Due to its unique combination of a portable computer form factor, the use of miniaturized portable computer electrical components, and the elimination of integral components such as a power supply/transformer structure, battery pack, display, keyboard and pointing device, the reduced footprint desktop CPU unit 14 (like the alternate embodiment 14a thereof) provides a variety of advantages over a conventionally constructed desktop CPU unit.

Specifically, the desktop CPU unit 14 requires considerably less desktop area than a conventional desktop CPU unit, and is much more easily handled and transported because of its greatly decreased bulk and weight. AS illustrated, the CPU unit 14 weighs approximately three pounds or less. It thus uniquely couples, in a single package, the functionality of a desktop computer with the mobility of a portable computer. Moreover, due to the elimination in the CPU unit 14 of various relatively fragile integral components, such as a built-in display, keyboard, battery pack and pointing device, it is provided with a more durable and physically robust construction.

By using industry standard connector ports in its I/O section 38, the reduced footprint desktop CPU unit 14 is rendered compatible with all standard desktop computer peripheral devices. Additionally, by utilizing high volume "commodity" notebook PC electronics and components therein, and a non-complex component packaging scheme, the CPU unit 14 becomes cost competitive with the much larger desktop CPU unit of conventional construction. Also, as a result of the small product form factor, reduced packaging, shipping, and inventory costs per system are desirably achieved.

Additionally, the CPU unit 14 provides quiet and safe operation due to its use of an external power supply (the AC cube 60) instead of an internal power supply with transformer, heat generating components and potential fan. Further, the CPU unit 14 is more flexible and adaptable due to its externally removable/swappable CD/floppy disk drive bay which can also accommodate future accessible media drives Such as DVD drives.

According to another feature of the present invention, the CPU unit 14 (as well as the alternate embodiment 14a thereof) may be operatively positioned not only in its FIG. 1 horizontal desktop orientation, but also in a desktop space-saving tower orientation (see FIG. 7) in which the CPU unit 14 is vertically supported, on its left housing end 32, on the desktop area 12 to further reduce the footprint area of the CPU unit 14.

The vertically oriented CPU unit 14 is uniquely braced in this tower orientation shown in FIG. 7 by means of a stabilizing member representatively in the form of an elongated stabilizing bar 72. Stabilizing bar 72 has a length just slightly less than the horizontal depth D of the CPU housing 22. With the CPU unit 14 in its horizontal desktop orientation depicted in FIG. 1, the bar 72 is essentially flush with an outer left end portion of the housing 22, being received within an elongated recess 74 formed in the left end 32 of the housing 22. Additionally, the stabilizing bar 72 has, on its opposite ends, transverse side edge flanges 76 and 78 which are respectively and complementarily received in corresponding top and bottom side recesses 76a, 78a in the housing 22 adjacent its left end 32.

Stabilizing bar 72 is slidably and captively retained within the end recess 74, for pivotal movement relative to the housing end 32 about an axis parallel to the housing dimension W, by a suitable pivot pin member 80 (see FIG. 5) extending centrally through the bar 72 into the left end of the housing 22. The bar 72 is pivotable between a flush orientation in which it longitudinally extends parallel to the housing dimension D with the bar flanges 76,78 being respectively received in the housing top and bottom side recesses 76a and 78a, and, as indicated by the arrows 82 in FIG. 5, a transverse bracing orientation (shown in FIG. 7, and in phantom in FIG. 5) in which the bar 72 longitudinally extends transversely to its flush orientation, with opposite end portions of the bar 72 projecting outwardly beyond the top and bottom sides 24,26 of the housing 22 so as to bracingly engage the desktop 12 when the housing 22 is positioned on its left end 32 in its tower orientation shown in FIG. 7. When it is desired to return the CPU unit 14 to its horizontal desktop orientation, the bar 72 is simply pivoted back to its flush orientation, with the receipt of the bar edge flanges 76,78 in their housing recesses 76a, 78a automatically stopping the bar in its flush orientation.

The foregoing detailed description is to be clearly understood as being given by way of illustration and example only, the spirit and scope of the present invention being limited solely by the appended claims.

What is claimed is:

1. A reduced footprint desktop CPU unit comprising:
   a housing; and
   electrical computer components closely received within said housing and being at least predominantly portable computer electrical components, said components including an I/O system for coupling said CPU unit to external desktop computer peripheral devices including a keyboard, monitor and pointing device, said electrical computer components not including an integral keyboard, display device or pointing device, and the interior of said housing being devoid of a power supply/transformer structure.

2. The reduced footprint desktop CPU unit of claim 1 wherein said electrical computer components are essentially entirely portable computer components.

3. The reduced footprint desktop CPU unit of claim 1 wherein the interior of said housing is further devoid of a cooling fan.

4. The reduced footprint desktop CPU unit of claim 1 wherein the interior of said housing is further devoid of a battery pack.

5. The reduced footprint desktop CPU unit of claim 1 wherein said housing has a portable notebook computer form factor.

6. The reduced footprint desktop CPU unit of claim 1 wherein said I/O system includes a plurality of I/O connectors.

7. The reduced footprint desktop CPU unit of claim 1 wherein said I/O system includes an infrared signal receiving system.

8. The reduced footprint desktop CPU unit of claim 1 wherein said electrical computer components further include a data storage device operative to store data, and a microprocessor operative to retrieve data from said data storage device.

9. The reduced footprint desktop CPU unit of claim 1 wherein said electrical computer components further include a media drive unit and a floppy disk drive.

10. The reduced footprint desktop CPU unit of claim 9 wherein said media drive unit is a CD ROM drive.

11. The reduced footprint desktop CPU unit of claim 9 wherein:
    said housing has an exterior wall opening therein, and
    said media drive unit and said floppy disk drive are linked together and carried by said housing for conjoint movement relative thereto through said opening between a concealed position within said housing and an exposed position outside of said housing.

12. The reduced footprint desktop CPU unit of claim 9 wherein:
    said housing has an exterior wall with a duality of slots extending therethrough, and
    said media drive unit and said floppy disk drive are fixedly positioned within said housing inwardly adjacent said duality of slots.

13. The reduced footprint desktop CPU unit of claim 9 wherein said electrical portable computer components further include a plurality of PC card receptacle structures at least partially disposed in a stacked relationship with said media drive unit.

14. The reduced footprint desktop CPU unit of claim 1 wherein:
    said housing has an elongated, generally rectangular configuration with an end wall extending between opposite top and bottom side walls,
    said housing is positionable on a horizontal support surface in (1) a horizontal desktop orientation in which said bottom side wall rests upon said support surface, and (2) a vertical tower orientation in which said end wall rests upon said support surface, and
    said reduced footprint desktop CPU unit further comprises a bracing structure movably carried by said end wall for movement relative thereto outwardly beyond said top and bottom side walls to engage said support surface and stabilize said housing when said housing is positioned in said vertical orientation on said support surface.

15. The reduced footprint desktop CPU unit of claim 14 wherein said bracing structure is an elongated bracing member having a longitudinally central portion pivotally secured to said end wall, said bracing member being pivotable to a stabilizing position in which opposite end portions thereof project outwardly beyond said top and bottom side walls of said housing.

16. The reduced footprint desktop CPU unit of claim 15 wherein said bracing member is pivotable away from said stabilizing position to a retracted position in which said bracing member is substantially flush with an end portion of said housing.

17. The reduced footprint desktop CPU unit of claim 16 wherein:
    said end wall of said housing has a recess therein, and
    said bracing member in said retracted position is received in said recess.

18. The reduced footprint desktop CPU unit of claim 17 wherein:
    said bracing member has a generally bar-shaped configuration with a transverse side edge flange formed on an end portion thereof, and
    one of said top and bottom side walls of said housing has a recess therein which complementarily receives said side edge flange when said bracing member is in said retracted position thereof.

19. Electronic apparatus comprising:
    an elongated, generally rectangular housing with an end portion having an end wall extending between opposite top and bottom side walls, said housing being positionable on a horizontal support surface in (1) a horizontal desktop orientation in which said bottom side wall rests upon said support surface, and (2) a vertical tower orientation in which said end wall rests upon said support surface;
    a plurality of electronic components operatively disposed within said housing; and
    an elongated bracing member having a longitudinally central portion pivotally secured to said end wall, said bracing member being pivotable to a stabilizing position in which opposite end portions thereof project outwardly beyond said top and bottom side walls to engage said support surface and stabilize said housing when said housing is in said vertical tower orientation on said support surface.

20. The electronic apparatus of claim 19 wherein said electronic apparatus is a desktop computer CPU unit.

21. The electronic apparatus of claim 19 wherein said bracing member is pivotable away from said stabilizing position to a retracted position in which said bracing member is substantially flush with said end portion of said housing.

22. The electronic apparatus of claim 21 wherein:
    said end wall of said housing has a recess therein, and
    said bracing member in said retracted position is received in said recess.

23. The electronic apparatus of claim 22 wherein:
    said bracing member has a generally bar-shaped configuration with a transverse side edge flange formed on an end portion thereof, and
    one of said top and bottom side walls of said housing has a recess therein which complementarily receives said side edge flange when said bracing member is in said retracted position thereof.

24. An electronic apparatus comprising:
an elongated, generally rectangular housing with an end portion having an end wall extending between opposite top and bottom side walls, the housing being positionable on a horizontal support surface in (1) a horizontal desktop orientation in which the bottom side wall rests on the horizontal support surface, and (2) a vertical tower orientation in which the end wall rests on the horizontal support surface, wherein the electronic apparatus is a desktop computer CPU unit and the housing has a portable notebook computer form factor;
a plurality of electronic components operatively disposed within the housing;
an elongated bracing member having opposite end portions and a longitudinally central portion pivotally secured to the end wall, wherein the bracing member is pivotable to a stabilizing position in which the opposite end portions project outwardly beyond the opposite top and bottom side walls to engage the horizontal support surface and to stabilize the housing on the horizontal support surface while the housing is positioned in the vertical tower orientation.

25. The electronic apparatus of claim 24, wherein the plurality of electronic components comprises desktop and portable computer components.

26. The electronic apparatus of claim 24, wherein the housing comprises a plurality of receptacles configured for interchangeably receiving and communicating with a plurality of electronic devices.

27. The electronic apparatus of claim 24, wherein the housing comprises a plurality of ports configured for interchangeably communicating with a plurality of peripheral devices.

28. The electronic apparatus of claim 24, wherein the bracing member is pivotable away from the stabilizing position to a retracted position in which the bracing member is substantially flush with the end portion of the housing.

29. The electronic apparatus of claim 28, wherein the end portion of the housing comprises a recess structure configured to receive the bracing member in the retracted position.

30. A desktop computer system comprising:
a desktop CPU unit including:
a housing; and
electrical computer components closely received within said housing, said electrical computer components being at least predominantly portable computer electrical components and including an I/O system, a data storage device, and a microprocessor for retrieving data from said data storage device, but not including an integral keyboard, display or pointing device, and the interior of said housing being devoid of a power supply/transformer structure;
a desktop computer keyboard operatively associateable with said I/O system;
a desktop computer display device operatively associateable with said I/O system; and
a desktop computer pointing device operatively associateable with said I/O system.

31. The desktop computer system of claim 30 wherein said electrical computer components are essentially entirely portable computer electrical components.

32. The desktop computer system of claim 30 wherein the interior of said housing is further devoid of a cooling fan.

33. The desktop computer system of claim 25 wherein the interior of said housing is further devoid of a battery pack.

34. The desktop computer system of claim 25 wherein said housing has a portable notebook computer form factor.

35. The desktop computer system of claim 25 wherein said I/O system includes a plurality of I/O connectors.

36. The desktop computer system of claim 25 wherein said I/O system includes an infrared signal receiving system.

37. The desktop computer system of claim 25 wherein said electrical portable computer components further include a media drive unit and a floppy disk drive.

38. The desktop computer system of claim 32 wherein said media drive unit is a CD ROM drive.

39. The desktop computer system of claim 32 wherein:
said housing has an exterior wall opening therein, and
said media drive unit and said floppy disk drive are linked together and carried by said housing for conjoint movement relative thereto through said opening between a concealed position within said housing and an exposed position outside of said housing.

40. The desktop computer system of claim 37 wherein:
said housing has an exterior wall with a duality of slots extending therethrough, and
said media drive unit and said floppy disk drive are fixedly positioned within said housing inwardly adjacent said duality of slots.

41. The desktop computer system of claim 37 wherein said electrical portable computer components further include a plurality of PC card receptacle structures at least partially disposed in a stacked relationship with said media drive unit.

42. The desktop computer system of claim 30 wherein:
said housing has an elongated, generally rectangular configuration with an end portion having an end wall extending between opposite top and bottom side walls,
said housing is positionable on a horizontal support surface in (1) a horizontal desktop orientation in which said bottom side wall rests upon said support surface, and (2) a vertical tower orientation in which said end wall rests upon said support surface, and
said reduced footprint desktop CPU unit further comprises a bracing structure movably carried by said end wall for movement relative thereto outwardly beyond said top and bottom side walls to engage said support surface and stabilize said housing when said housing is positioned in said vertical orientation on said support surface.

43. The desktop computer system of claim 42 wherein said bracing structure is an elongated bracing member having a longitudinally central portion pivotally secured to said end wall, said bracing member being pivotable to a stabilizing position in which opposite end portions thereof project outwardly beyond said top and bottom side walls of said housing.

44. The desktop computer system of claim 43 wherein said bracing member is pivotable away from said stabilizing position to a retracted position in which said bracing member is substantially flush with said end portion of said housing.

45. The desktop computer system of claim 44 wherein:
said end wall of said housing has a recess therein, and
said bracing member in said retracted position is received in said recess.

46. The desktop computer system of claim 45 wherein:
said bracing member has a generally bar-shaped configuration with a transverse side edge flange formed on an end portion thereof, and one of said top and bottom side walls of said housing has a recess therein which complementarily receives said side edge flange when said bracing member is in said retracted position thereof.

* * * * *